(12) United States Patent
Noh et al.

(10) Patent No.: US 11,088,436 B2
(45) Date of Patent: Aug. 10, 2021

(54) NFC ANTENNA MODULE

(71) Applicant: AMOTECH CO., LTD., Incheon (KR)

(72) Inventors: Jin-Won Noh, Gwangju (KR);
Hyung-Il Baek, Gyeonggi-do (KR);
Beom-Jin Kim, Gyeonggi-do (KR);
Yong-Ho Hwang, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 58 days.

(21) Appl. No.: 15/541,299

(22) PCT Filed: Jan. 5, 2016

(86) PCT No.: PCT/KR2016/000072
§ 371 (c)(1),
(2) Date: Jun. 30, 2017

(87) PCT Pub. No.: WO2016/111533
PCT Pub. Date: Jul. 14, 2016

(65) Prior Publication Data
US 2017/0365913 A1    Dec. 21, 2017

(30) Foreign Application Priority Data

Jan. 5, 2015   (KR) .................. 10-2015-0000489

(51) Int. Cl.
*H01Q 1/24* (2006.01)
*H01Q 7/00* (2006.01)
(Continued)

(52) U.S. Cl.
CPC .............. *H01Q 1/243* (2013.01); *G06K 19/07* (2013.01); *G06K 19/077* (2013.01);
(Continued)

(58) Field of Classification Search
CPC .. H01Q 1/2208; H01Q 1/2225; H01Q 1/2258; H01Q 1/2266; H01Q 1/24;
(Continued)

(56) References Cited

U.S. PATENT DOCUMENTS 9,674,646 B2 *  6/2017  Jang ...................... H01Q 1/273
9,705,206 B2 *  7/2017  Yosui .................... H01Q 5/335
(Continued)

FOREIGN PATENT DOCUMENTS

JP       2014-168308 A    9/2014
KR    10-2012-0117134 A   10/2012
(Continued)

*Primary Examiner* — Andrea Lindgren Baltzell
*Assistant Examiner* — Patrick R Holecek
(74) *Attorney, Agent, or Firm* — CL Intellectual LLC

(57) ABSTRACT

Provided is an NFC antenna module which connects a side cover (i.e. metal frame), which is formed at one side of a portable terminal, to the antenna pattern so that the side cover is operated as an auxiliary radiator of an antenna pattern. The presented NFC antenna module comprises: a side cover made of a metal material and coupled to one side of the portable terminal; an antenna pattern having one end connected to a short-range communication chipset embedded in the portable terminal; a first terminal portion of the antenna pattern, the first terminal portion having one end connected to the short-range communication chipset and the other end connected to the side cover; and a second terminal portion having one end connected to the other end of the antenna pattern and the other end connected to the side cover.

7 Claims, 8 Drawing Sheets

(51) Int. Cl.
*G06K 19/077* (2006.01)
*G06K 19/07* (2006.01)
*H01Q 1/22* (2006.01)

(52) U.S. Cl.
CPC ..... *G06K 19/07775* (2013.01); *H01Q 1/2225* (2013.01); *H01Q 7/00* (2013.01)

(58) Field of Classification Search
CPC ........ H01Q 1/241; H01Q 1/242; H01Q 1/243; H01Q 1/245; H01Q 1/36; H01Q 7/00; H01Q 7/005; H01Q 7/02; H01Q 7/04; H01Q 7/06; H01Q 7/08; H04B 5/0031; H04B 5/0075; H04B 5/0081; H04B 5/02; G06K 19/07; G06K 19/077; G06K 19/07775; G06K 19/07773; G06K 19/07777; G06K 19/07779; G06K 19/07781; G06K 19/07783
See application file for complete search history.

(56) References Cited

U.S. PATENT DOCUMENTS

| | | | | |
|---|---|---|---|---|
| 9,742,203 B2 * | 8/2017 | Jeong | ................... | H04B 5/0037 |
| 9,780,450 B2 * | 10/2017 | Nakano | ................. | H01Q 1/243 |
| 10,062,956 B2 * | 8/2018 | Ito | ............................ | H01Q 7/00 |

FOREIGN PATENT DOCUMENTS

| | | | |
|---|---|---|---|
| KR | 10-2013-0032545 A | | 4/2013 |
| KR | 10-2014-0102618 A | | 8/2014 |
| KR | 10-2014-0134237 A | | 11/2014 |

* cited by examiner

| Minimum Value required (mV) | Position of PICC | EMVCo Load Modulation Type A | | | | | |
|---|---|---|---|---|---|---|---|
| | | General Structure (FIG. 1) | | Present Invention (FIG. 3) | | Present Invention (FIG. 3) | |
| | | Verdict | Vpp(mV) | Verdict | Vpp(mV) | Verdict | Vpp(mV) |
| 8.8 | (0,0,0) | PASS | 30.93 | PASS | 30.85 | PASS | 35.46 |
| 7.2 | (1,0,0) | PASS | 21.65 | PASS | 23.96 | PASS | 24.79 |
| 5.6 | (2,0,0) | PASS | 16.86 | PASS | 17.81 | PASS | 16.61 |
| 4 | (3,0,0) | PASS | 10.15 | PASS | 10.17 | PASS | 11.30 |

FIG. 7

| Section | Communication Distance (Recognition Distance) [mm] | | |
| --- | --- | --- | --- |
| | Card mode(VIVOpay) | | |
| | 0° | 45° | 90° |
| Structure (FIG. 1) | 60 | 30 | 20 |
| Present Invention (FIG. 3) | 60 | 40 | 30 |
| Present Invention (FIG. 6) | 60 | 40 | 30 |

FIG. 8

NFC ANTENNA MODULE

TECHNICAL FIELD

The present invention relates to an NFC antenna module, and more particularly, to an NFC antenna module which can use a metal case as an auxiliary radiator in a portable terminal that adopts the metal case.

This application is a National Stage of International Application No. PCT/KR2016/000072, filed Jan. 5, 2016, which claims priority from Korean Patent Application No. 10-2015-0000489 filed on Jan. 5, 2015 in the Korean Intellectual Property Office, the disclosure of which is incorporated herein by reference in its entirety.

BACKGROUND ART

With the development of technology, portable terminals, such as a portable phone, PDA, PMP, navigation, and laptop, additionally provide functions of DMB, wireless internet, and device-to-device near field communication in addition to basic functions of call, moving image/music reproduction, and road guide. Accordingly, a portable terminal is provided with a plurality of antennas for wireless communications, such as wireless internet and Bluetooth.

Recently, there is a trend to apply functions of information exchange between terminals, settlement, ticket reservation, and retrieval to a portable terminal using near field communication (NFC). For this, a portable terminal is mounted with an antenna module for a portable terminal (i.e., NFC antenna module) that is used for a near field communication system. In this case, the NFC antenna module being used is a non-contact type NFC module that uses a frequency band of about 13.56 MHz as one kind of radio frequency identification (RFID), and transmits data between terminals in a short distance of about 10 cm. The NFC is widely used in the fields of not only settlement but also commodity information at a supermarket or a general store, transmission of travel information for visitors, traffic, and an access control locking device.

Recently, markets for portable terminals, such as tablets and smart phones, have been rapidly extended. The portable terminal tends to include functions of information exchange between terminals, settlement, ticket reservation, and retrieval using near field communication (NFC). Accordingly, there has been an increasing demand for NFC antenna modules used for the near field communication.

The NFC antenna module is formed in a plan shape, and is mounted on a battery pack or a back cover (or a rear cover). As an example, the NFC antenna module is composed of a shielding sheet (e.g., a metal plate such as a ferrite sheet) stacked on an upper portion of a battery of a portable terminal, and a radiator pattern stacked on an upper portion of the shielding sheet, and is mounted in the battery pack of the portable terminal.

In general, the back cover of the portable terminal is formed of a polycarbonate material, and thus it does not exert an influence on communications of the NFC antenna that is mounted on the battery pack or the back cover.

However, according to the recent trend (e.g., design trend, such as grip feeling or external appearance) that is preferred by consumers, a demand for production of a back cover of a metal material is on an increasing trend. In this case, an NFC antenna signal is shielded by the metal material to cause a problem that the NFC performance (i.e., recognition range) deteriorates or the communication itself is unable to be performed.

DISCLOSURE

Technical Problem

The present invention has been made in order to solve the above problems, and an object of the present invention is to provide an NFC antenna module which can make a side cover (i.e., metal frame) that is formed on one side surface of a portable terminal operate as an auxiliary radiator of an antenna pattern through connection of the side cover to the antenna pattern.

Other objects and advantages of the present invention will be more clearly described below with reference to the detailed description and claims of the present invention.

Technical Solution

In accordance with an aspect of the present invention, an NFC antenna module includes a side cover formed of metal material and coupled to a portable terminal; an antenna pattern connected to a near field communication (NFC) chipset that is built in the portable terminal; a first terminal portion configured to connect the NFC chipset to the side cover; and a second terminal portion configured to connect the antenna pattern to the side cover.

The side cover may be coupled to an upper side surface of the portable terminal, and has one end portion connected to the first terminal portion and the other end portion connected to the second terminal portion.

The first terminal portion and the second terminal portion may be connected to the side cover by soldering.

The first terminal portion and the second terminal portion may be provided with contacts, and are connected to the side cover through the contacts.

The second terminal portion may be spaced apart from the first terminal portion to be connected to the side cover.

The NFC antenna module according to the aspect of the present invention may further include a back cover formed of metal material and coupled to a back surface of the portable terminal to form an overlapping region with the antenna pattern.

The back cover may include a metal material region that overlaps a part of the antenna pattern to operate as an auxiliary radiator; and a non-metal material region that overlaps one other part of the antenna pattern.

The back cover may include a first metal material region that overlaps a part of one side of the antenna pattern to operate as an auxiliary radiator; a second metal material region that is spaced apart from the first metal material region to form a spaced region, and overlaps a part of the other side of the antenna pattern to operate as an auxiliary radiator; and a non-metal material region formed on the spaced region to overlap a part of the antenna pattern.

Advantageous Effects

According to the NFC antenna module according to the present invention, the side cover that is formed on one side surface of the portable terminal is connected to the antenna pattern to operate as an auxiliary radiator of the antenna pattern. Accordingly, the NFC antenna module can maximize the recognition range thereof while providing the antenna characteristic that is equal to that of the NFC antenna module having the general structure.

Further, according to the NFC antenna module, since the side cover is connected to the antenna pattern to operate as an auxiliary radiator of the antenna pattern, convenience can be increased in comparison to the general NFC antenna module.

DESCRIPTION OF DRAWINGS

FIGS. 7 and 8 are diagrams comparatively explaining the antenna characteristics between an NFC antenna module having a general structure and an NFC antenna module according to an embodiment of the present invention.

MODE FOR INVENTION

Figure 1:
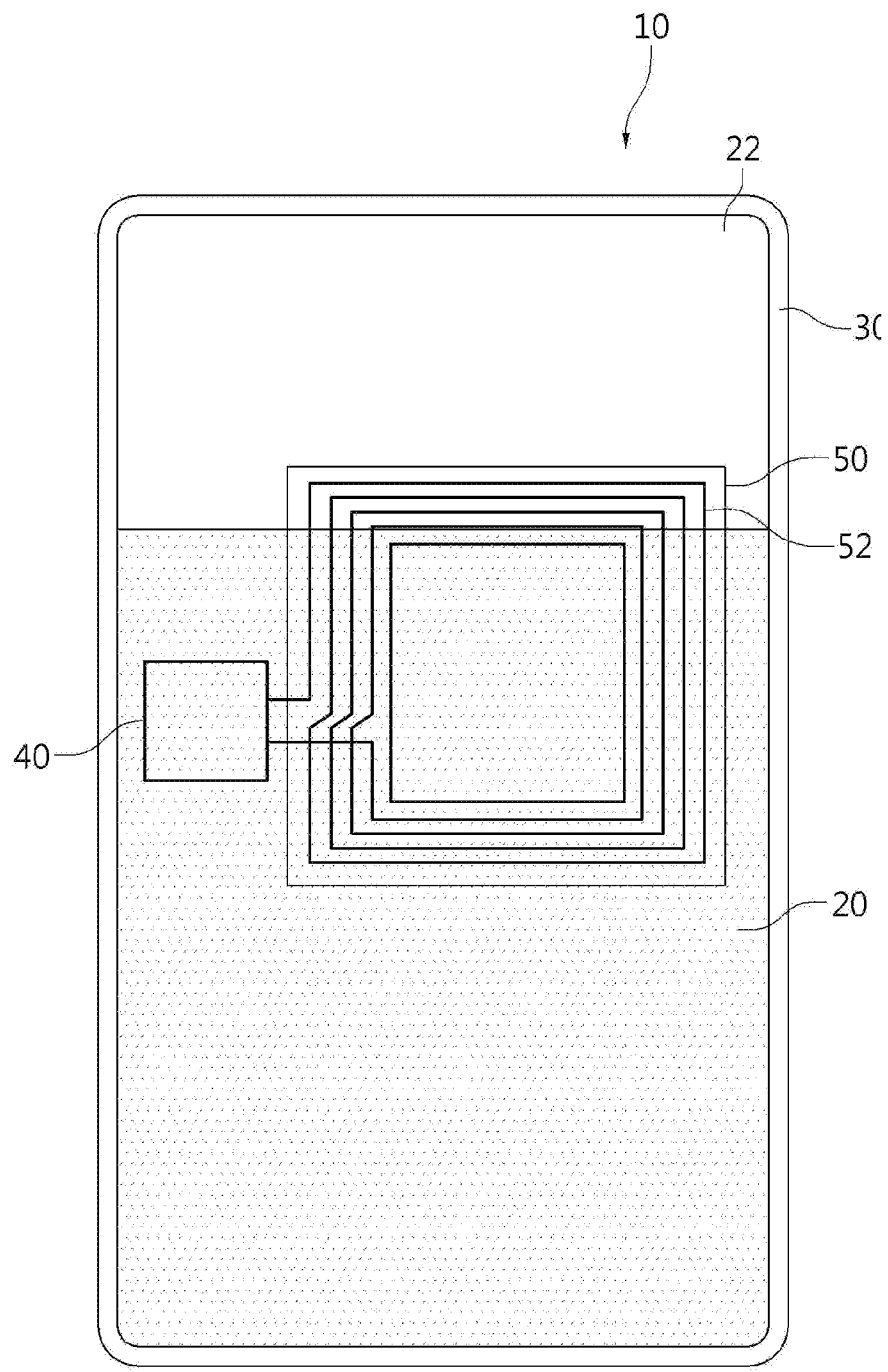
FIG. 1 is a view explaining an NFC antenna module that is mounted on a portable terminal to which a metal case is applied.

Hereinafter, preferred embodiments of the present invention will be described in detail with reference to the accompanying drawings so that those of ordinary skill in the art can easily embody the technical idea of the present invention. In order to help understanding of the embodiments to be described hereinafter, the same drawing reference numerals are used for the same elements, even in different drawings. In describing the present invention, well-known related configurations or functions are not described in detail since they would obscure the subject matter of the present invention.

Referring to FIG. 1, a portable terminal 10, to which a metal case is applied, is provided with the metal case that includes a back cover 20 and a side cover 30 that are positioned on surfaces of the portable terminal excluding a front surface thereof on which a display is arranged. If the back cover 20 is entirely formed of a metal material in a state where an NFC antenna module 50 that includes a chipset 40 and an antenna pattern 52 is mounted on the inside of the portable terminal 10, the communication performance of the NFC antenna module 50 deteriorates. Accordingly, a partial region of the back cover 20 of the portable terminal 10 is formed of a non-metal material 22, and thus a part of the antenna pattern 52 is arranged on a region that is formed of the non-metal material 22.

In this case, since the back cover 20 and the side cover 30 of the portable terminal 10 are formed of the metal material, a radiation field is formed only toward a back surface (i.e., a surface that is opposite to the front surface on which the display is arranged), and thus a near field communication (NFC) can be performed.

Figure 2:
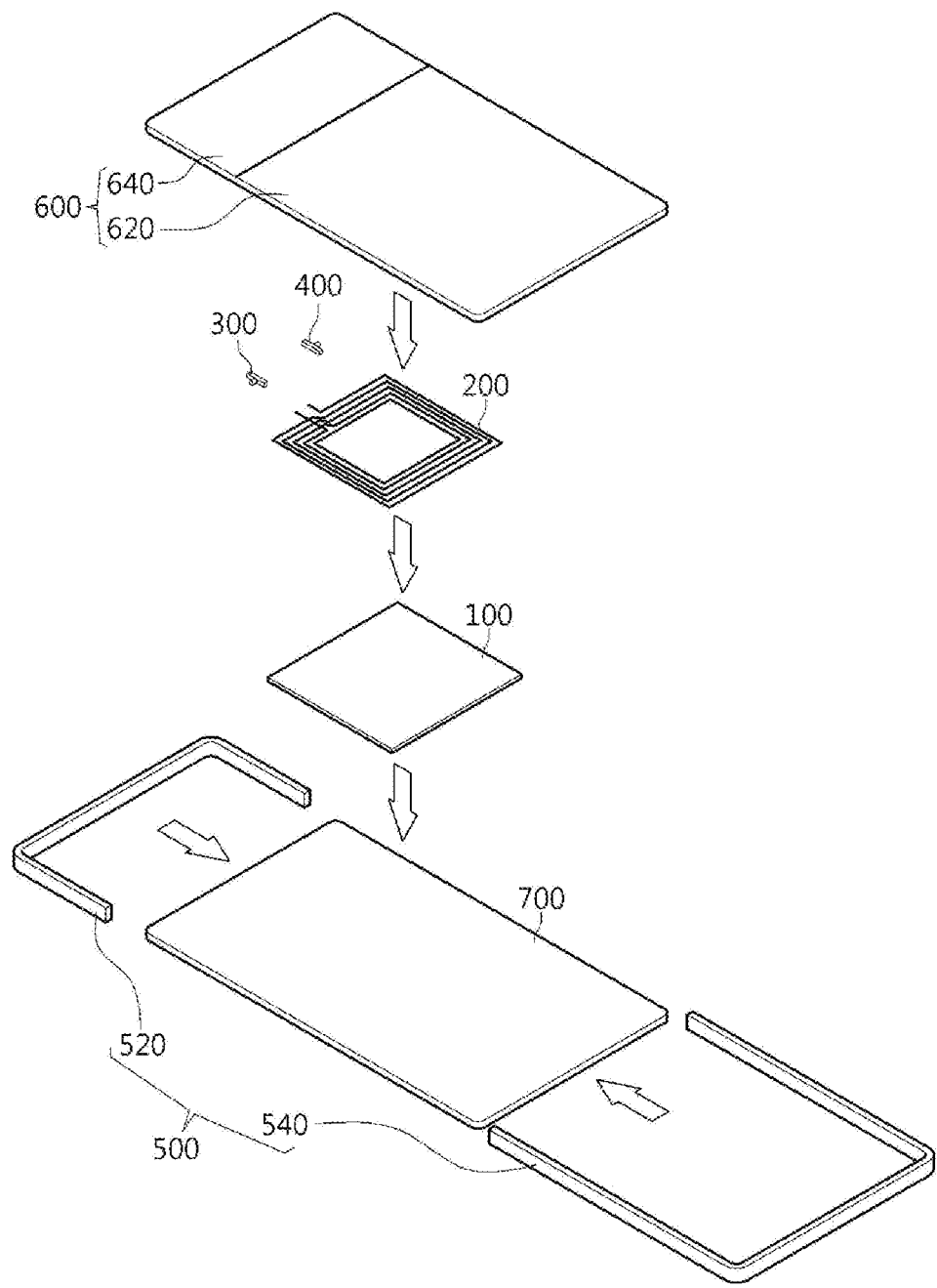
FIGS. 2 and 3 are views explaining an NFC antenna module according to an embodiment of the present invention.
Figure 3:
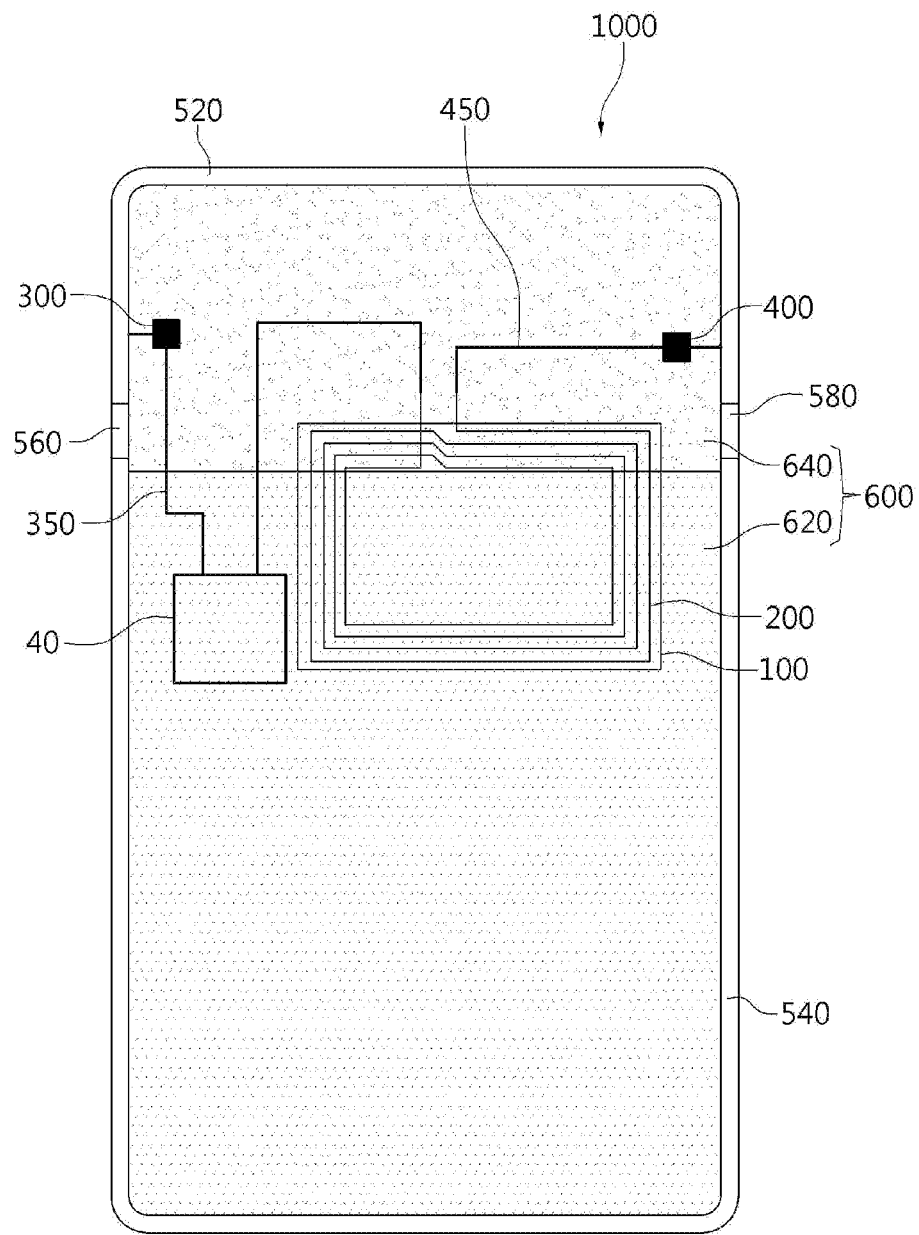

One of side covers of the portable terminal is connected to the NFC antenna module to operate as an auxiliary radiator, and thus the recognition range can be increased. For this, as illustrated in FIGS. 2 and 3, the NFC antenna module is configured to include a base sheet 100, an antenna pattern 200, a first terminal portion 300, a second terminal portion 400, a side cover 500, and a back cover 600.

The base sheet 100 is installed on a mounting structure 700 of a portable terminal 1000. That is, the base sheet 100 has an upper surface onto which the antenna pattern 200 (e.g., NFC antenna pattern) is stacked and a lower surface that is coupled to the mounting structure 700 of the portable terminal 1000. The base sheet 100 operates as a shielding sheet that performs shielding between the antenna pattern 200 and the mounting structure 700 of the portable terminal 1000. The base sheet 100 is formed of a material, such as a ferrite sheet, a polymer sheet, a nano-ribbon sheet, or an iron-series sheet.

The antenna pattern 200 is configured by printing fine lines in a loop shape on an upper surface of a flexible circuit board. The antenna pattern 200 may be formed in a loop shape in which a wire is disposed along the outer periphery of the base sheet 100 and is wound plural times in a center direction of the upper surface of the base sheet 100. The antenna pattern 200 transmits/receives a near field communication (NFC) signal to/from an antenna pattern 200 that is mounted on another portable terminal 1000. In this case, one end of the antenna pattern 200 is connected to a chipset (e.g., NFC chipset) that is built in the portable terminal 1000 for processing an NFC signal that is transmitted or received through the antenna pattern 200, and the other end thereof is connected to the second terminal portion 400.

One side of the first terminal portion 300 is connected to the chipset that is built in the portable terminal 1000 for processing the NFC signal that is transmitted or received through the antenna pattern 200. That is, the first terminal portion 300 is installed on the base sheet 100, the mounting structure (e.g., main board) 700 of the portable terminal 1000, and a separate flexible circuit board. The first terminal portion 300 is connected to the chipset through a first connection line. In this case, the first connection line may be formed on the upper surface of the base sheet 100 through a wire, or may be formed on the mounting structure 700 or the flexible circuit board through a fine line print.

The other side of the first terminal portion 300 is connected to the side cover 500. In this case, the other side of the first terminal portion 300 may be formed to be connected to the side cover 500 through soldering, or may be structured to come in contact with the side cover 500 through an elastic member (not illustrated). Of course, the other side of the first terminal portion 300 may be formed as a contact that is structured to come in contact with a part of the side cover 500 during coupling of the side cover 500.

One side of the second terminal portion 400 is connected to the antenna pattern 200. That is, the second terminal portion 400 is installed on the base sheet 100, the mounting structure 700 of the portable terminal 1000, and a separate flexible circuit board. The second terminal portion 400 is connected to the other end of the antenna pattern 200 through a second connection line 450. In this case, the second connection line may be formed on the upper surface of the base sheet 100 through a wire, or may be formed on the mounting structure 700 or the flexible circuit board through a fine line print.

The other side of the second terminal portion 400 is connected to the side cover 500. That is, the second terminal portion 400 is connected to the side cover 500 of a portion that is opposite to the portion to which the first terminal portion 300 is connected. In this case, the other side of the second terminal portion 400 may be formed to be connected to the side cover 500 through soldering, or may be structured to come in contact with the side cover 500 through an elastic member (not illustrated). Of course, the other side of the second terminal portion 400 may be formed as a contact that is structured to come in contact with a part of the side cover 500 during coupling of the side cover 500. Here, referring to FIGS. 2 and 3, it is illustrated and described that the second terminal portion 400 is connected to the side cover 500 of the portion that is opposite to the portion that is connected to the first terminal portion 300, but is not limited thereto. The other end of the second terminal portion 400 may be spaced apart from the other end of the first terminal portion 300 to be connected to the side cover 500. That is, the second terminal portion 400 may be connected to a region of the side cover 500 that is spaced apart for a predetermined distance from a region of the side cover 500 to which the first terminal portion 300 is connected.

The side cover 500 is formed of a metal material, and is coupled to one side surface of the portable terminal 1000. In general, the side cover 500 that is coupled to the portable terminal 1000 is composed of a first side cover 520 that is coupled to a part of both side surfaces and an upper side surface based on the front surface of the portable terminal 1000, and a second side cover 540 that is coupled to the other part of both side surfaces and a lower side surface. In this case, the first side cover 520 and the second side cover 540 are spaced apart for a predetermined distance from both side surfaces of the portable terminal 1000 to form a spaced region. The side cover 500 may further include a third side cover 560 and a fourth side cover 580, each of which is formed of a non-metal material, and has one end that is coupled to the first side cover 520 and the other end that is coupled to the second side cover 540. Here, independent side covers 500 may be respectively formed on upper side, left side, right side, and lower side surface.

Because a user mainly holds a lower portion of the portable terminal 1000 in order to use the portable terminal 1000, when the second side cover 540 is used as an auxiliary radiator of the antenna pattern 200, the communication performance may deteriorate due to the user's contact. Accordingly, the first side cover 520 of the side cover 500 may be used as the auxiliary radiator of the antenna pattern 200 in order to maximize the communication performance.

Figure 4:
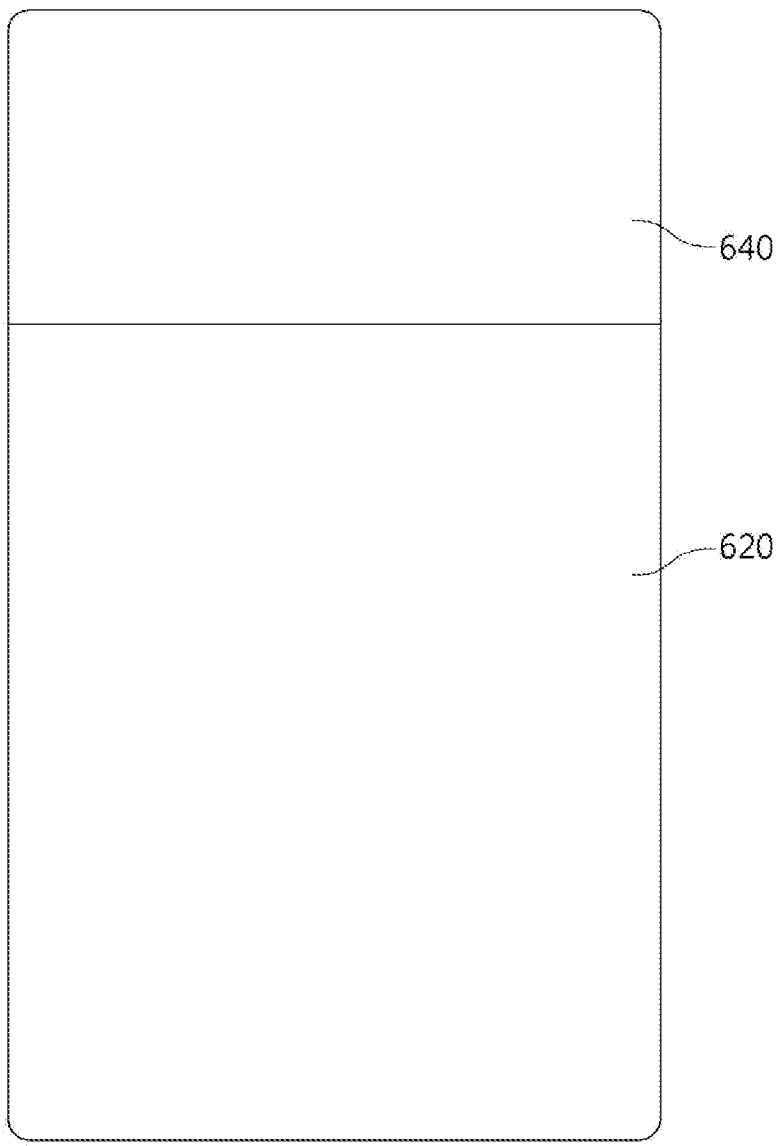
FIGS. 4 and 5 are views explaining a back cover of FIG. 2.

The back cover 600 is coupled to the back surface of the portable terminal 1000. In this case, as illustrated in FIG. 4, the back cover 600 is formed to include a metal material region 620 and a non-metal material region 640. The metal material region 620 and the non-metal material region 640 of the back cover 600 are formed to overlap the antenna pattern 200, and operate as the auxiliary radiator of the antenna pattern 200. That is, the metal material region 620 of the back cover 600 overlaps the antenna pattern 200, and operates as the auxiliary radiator of the antenna pattern 200 through coupling between the antenna pattern 200 and the metal material region 620. In this case, if the antenna pattern 200 entirely overlaps the metal material region 620, the communication performance may deteriorate due to the metal material region 620. Accordingly, the non-metal material region 640 of the back cover 600 is formed to partially overlap the antenna pattern 200.

Figure 5:
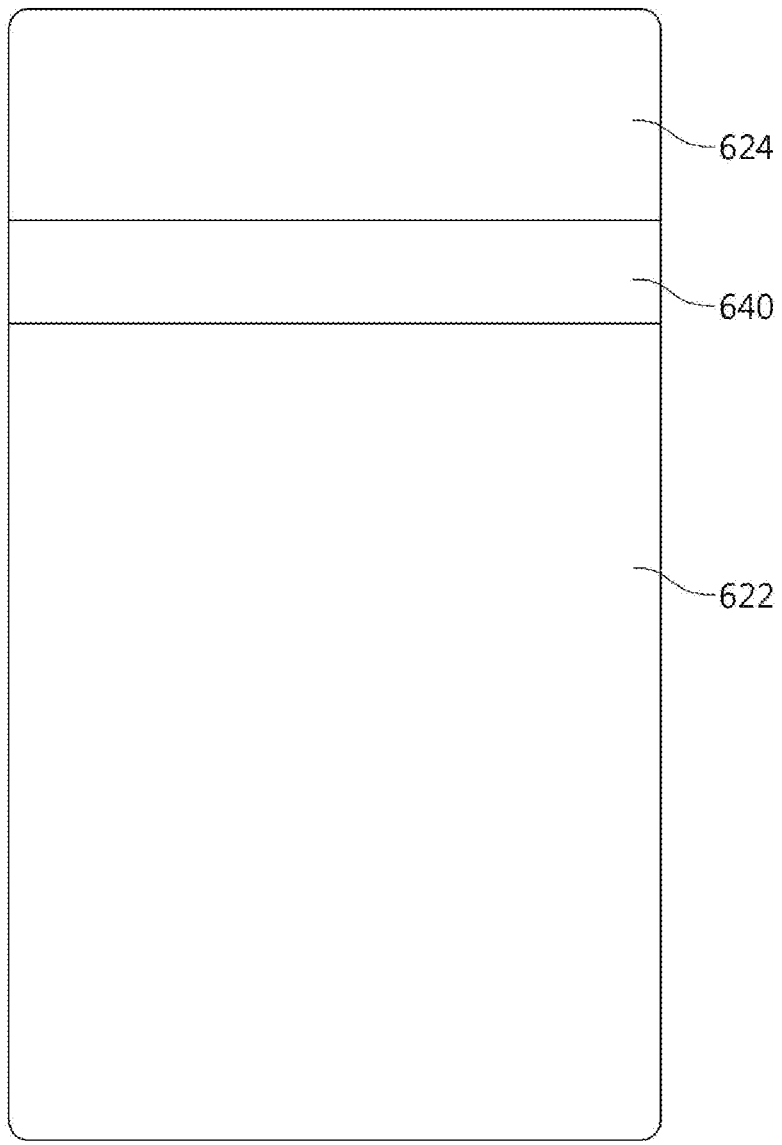
Figure 6:
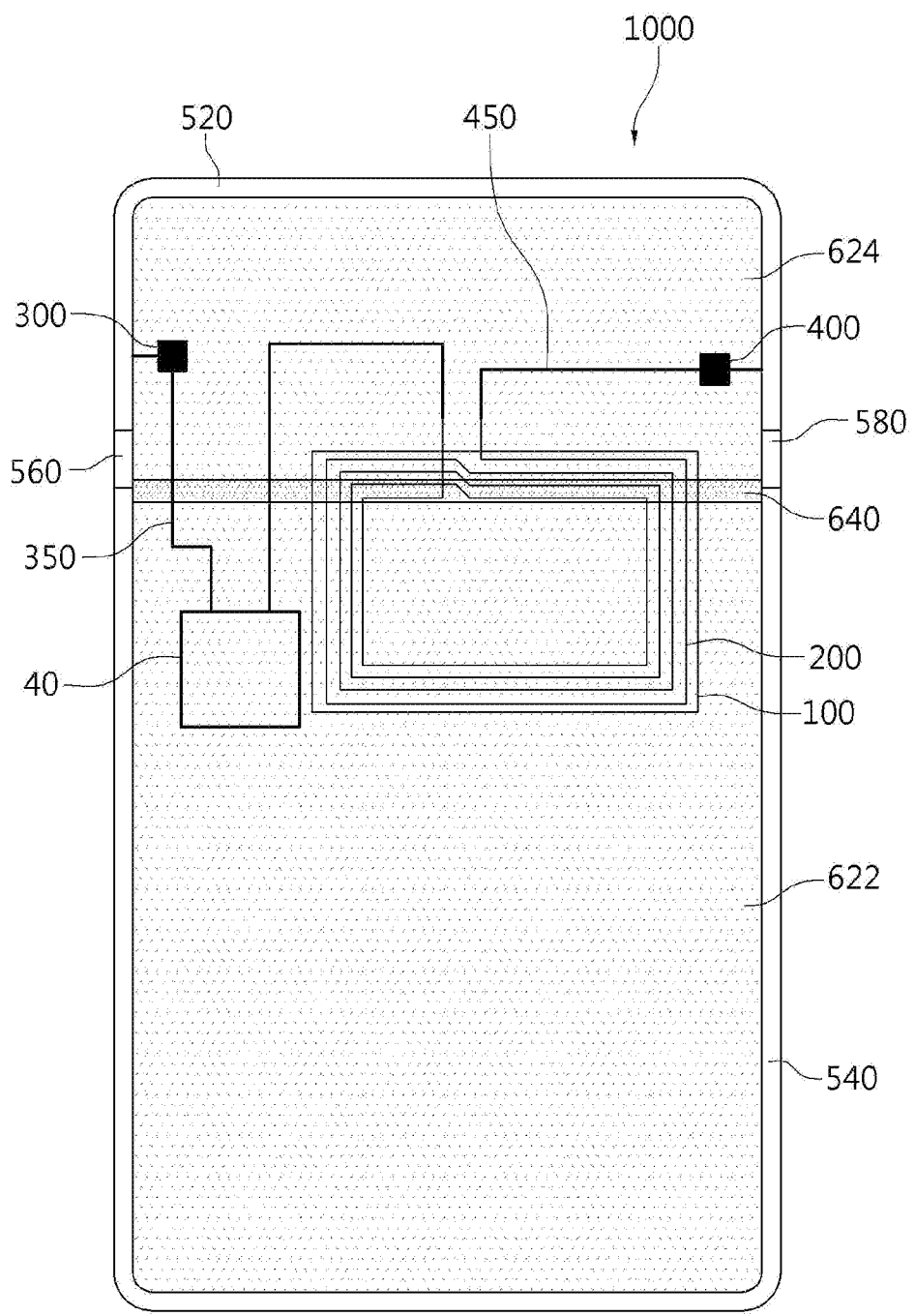
FIG. 6 is a view explaining a modified example of an NFC antenna module according to an embodiment of the present invention.

On the other hand, as illustrated in FIG. 5, the back cover 600 may be formed to include a first metal material region 622, a non-metal material region 640, and a second metal material region 624. Accordingly, as illustrated in FIG. 6, the first metal material region 622 and the second metal material region 624 are coupled in a region that partially overlaps the antenna pattern 200 to operate as the auxiliary radiator of the antenna pattern 200.

Hereinafter, the antenna characteristics of an NFC antenna module having a general structure and an NFC antenna module according to an embodiment of the present invention will be described with reference to the accompanying drawings.

Referring to FIG. 7, if a PICC position is (0,0,0), the required minimum voltage is 8.8 mV, and if a PICC position is (1,0,0), the required minimum voltage is 7.2 mV. Further, if a PICC position is (2,0,0), the required minimum voltage is 5.6 mV, and if a PICC position is (3,0,0), the required minimum voltage is 4 mV. Based on this, the antenna characteristics of EMVCo load modulation type A between the NFC antenna module having the general structure and the NFC antenna module according to the present invention are compared with each other to reach the following results. That is, the results of evaluations for the minimum voltages according to the respective PICC positions are all "PASS", and the antenna characteristics are also kept equivalent levels.

On the other hand, referring to FIG. 8, in a card mode, both an NFC antenna module having a general structure and an NFC antenna module according to embodiments of the present invention have recognition distances of about 60 mm if the back surface of a portable terminal 1000 is in parallel to a plane on which a terminal in a reader mode is positioned.

However, if an angle between the back surface of a portable terminal 1000 and a plane on which a terminal in a reader mode is positioned is 45°, an NFC antenna module having a general structure has a recognition distance of 30 mm, whereas an NFC antenna module according to embodiments of the present invention has an improved recognition distance of 40 mm.

Further, if an angle between the back surface of a portable terminal 1000 and a plane on which a terminal in a reader mode is positioned is 90° (i.e., the side surface of the portable terminal 1000 is arranged vertical to the reader mode terminal), an NFC antenna module having a general structure has a recognition distance of 20 mm, whereas an NFC antenna module according to embodiments of the present invention has an improved recognition distance of 30 mm.

As described above, it can be known that the NFC antenna module according to the present invention can improve the communication distance (i.e., recognition distance) according to the angle of the portable terminal while maintaining the antenna characteristic that is equal to that of the NFC antenna module having a general structure. According to the NFC antenna module according to the present invention, as the communication distance is improved, the NFC recognition range is also increased. Accordingly, the NFC antenna module according to the present invention can increase user's convenience as compared with the NFC antenna module having the general structure that requires a state where the back surface of the portable terminal 1000 is adjacent to a terminal in a reader mode.

It will be understood by those skilled in the art that the present invention is not limited to the foregoing embodiments but various modifications and changes of the present invention may be made without departing from the spirit and scope of the present invention and are included in the configuration of the present invention.

The invention claimed is:

1. An NFC antenna module comprising:
a side cover consisted of metal material and coupled to a portable terminal;
an antenna pattern wound from an outer periphery of a upper surface of a circuit board to a center direction of the upper surface of the circuit board to form in a loop shape wound plural times on the upper surface of the circuit board in the portable terminal, and connected to a near field communication (NFC) chipset that is built in the portable terminal;
a first terminal portion configured to connect the NFC chipset to the side cover; and
a second terminal portion configured to connect the antenna pattern to the side cover
wherein the side cover is coupled to an upper side surface of the portable terminal, and has one end portion connected to the first terminal portion and the other end portion connected to the second terminal portion,
wherein one end of the antenna pattern is connected to the NFC chipset,
wherein the side cover includes a first side cover, the first side cover being coupled to a part of both side surfaces and an upper side surface of the portable terminal,
wherein the first side cover has one end portion contacted to the first terminal portion connected to the NFC chipset, and has the other end portion of the first side cover contacted to the second terminal portion connected to the other end of the antenna pattern.

2. The NFC antenna module of claim 1, wherein the first terminal portion and the second terminal portion are connected to the side cover by soldering.

3. The NFC antenna module of claim 1, wherein the first terminal portion and the second terminal portion are provided with contacts, and are connected to the side cover through the contacts.

4. The NFC antenna module of claim 1, wherein the second terminal portion is spaced apart from the first terminal portion to be connected to the side cover.

5. The NFC antenna module of claim 1, further comprising a back cover formed of metal material and coupled to a back surface of the portable terminal to form an overlapping region with the antenna pattern.

6. The NFC antenna module of claim 5, wherein the back cover comprises:
a metal material region that overlaps a part of the antenna pattern to operate as an auxiliary radiator; and
a non-metal material region that overlaps one other part of the antenna pattern.

7. The NFC antenna module of claim 5, wherein the back cover comprises:
a first metal material region that overlaps a part of one side of the antenna pattern to operate as an auxiliary radiator;
a second metal material region that is spaced apart from the first metal material region to form a spaced region, and overlaps a part of the other side of the antenna pattern to operate as an auxiliary radiator; and
a non-metal material region formed on the spaced region to overlap a part of the antenna pattern.

* * * * *